United States Patent [19]

Klyosov et al.

[11] Patent Number: 5,777,086
[45] Date of Patent: Jul. 7, 1998

[54] METHOD OF RECOVERING LIGNIN FROM PULP AND PAPER SLUDGE

[75] Inventors: Anatole A. Klyosov, Newton; George P. Philippidis, Boston; Yiannis A. Monovoukas, Waltham, all of Mass.

[73] Assignee: Thermo Fibergen, Inc., Bedford, Mass.

[21] Appl. No.: 854,627

[22] Filed: May 12, 1997

[51] Int. Cl.$^6$ .................................................. C07G 1/00
[52] U.S. Cl. .................................................. 530/500
[58] Field of Search .................................................. 530/500

[56] References Cited

U.S. PATENT DOCUMENTS

| | | | |
|---|---|---|---|
| 4,111,928 | 9/1978 | Holsopple et al. | |
| 4,265,809 | 5/1981 | Holsopple et al. | |
| 4,455,257 | 6/1984 | Hoftiezer et al. | |
| 4,775,744 | 10/1988 | Schilling | 530/501 |
| 4,781,840 | 11/1988 | Schilling et al. | 210/730 |
| 4,787,960 | 11/1988 | Schilling et al. | 162/158 |
| 4,789,523 | 12/1988 | Schilling et al. | 422/12 |
| 4,799,285 | 1/1989 | Berfield | 15/327 |
| 4,851,457 | 7/1989 | Kurple | 523/142 |
| 4,908,098 | 3/1990 | DeLong et al. | 162/16 |
| 5,034,094 | 7/1991 | Kurple | 162/16 |
| 5,405,554 | 4/1995 | Neff et al. | 252/309 |
| 5,543,058 | 8/1996 | Miller | 210/725 |

FOREIGN PATENT DOCUMENTS

| | | |
|---|---|---|
| 263661 | of 1965 | Austria |
| 398990 | of 1993 | Austria |

OTHER PUBLICATIONS

M.A. El-Taraboulsi et al., "Lignin derivatives from desilicated rice straw soda black liquor," *Paperi ja Puu –Papperoch Tra*, 10:589–593 (1980).

K. Grohmann et al., "The Role of Ester Groups in Resistance of Plant Cell Wall Polysaccharides to Enzymatic Hydrolysis," *Applied Biochemistry and Biotechnology*, 20:45–60 (1989).

O. Karlsson et al., "Evidence for Chemical Bonds Between Lignin and Cellulose in Kraft Pulps," *Journal of Pulp and Paper Science*, 22:397–401 (1996).

J. Kubikova et al., "Hydrothermal pretreatment of wheat straw for the production of pulp and paper," *Tappi Journal*, 79:163–169 (1996).

V. Nyman et al., "The Colloidal Behaviour of Kraft Lignin and Lignosulfonates," *Colloids and Surfaces*, 21:125–147(1986).

S. Pedersen et al., "Novel Industrial Enzyme Applications," *Annals of the New York Academy of Sciences*, 750:376–391 (1995).

S.M. Siegel, "Biochemistry of the Plant Cell Wall," *Comprehensive Biochemistry*, pp. 1–51 (1968).

J. Wang et al., "Isolation and Characterization of Lignin Extracted from Softwood Kraft Pulp After Xylanase Treatment," *Journal of Pulp and Paper Science*, 23:J47–J51 (1997).

"The Generation, Identification and Treatability of Cod from CTMP Production," *1992 Pulping Conference*, 1161–1162 (1992).

L.R. Hudson et al., "Use and Value of Reactive Lignin," *Final Report*, NYSERDA, Mar. 1988.

S.B. Palmora et al., "The Hydrolysis of Lignin as a Coagulant," *Lesnoi Zhurnal*, 1:161–162 (1977).

*Primary Examiner*—Nathan M. Nutter
*Attorney, Agent, or Firm*—Cesari and McKenna, LLP

[57] ABSTRACT

A thermochemical process is provided for the use of pulp and paper sludge as a source of lignin through extraction and recovery. Pulp and paper sludge contains common components of plant materials as well as minerals employed in papermaking. Sludge is mixed in an alkaline solution (NaOH 0.4% to 4% by weight, preferably 0.5% to 2%, and most preferably 1% NaOH by weight). The solution is heated in an autoclave at a temperature of 150°–250° C. (preferably 180°–220° C., and most preferably 200° C.) for a short time, e.g., from about half an hour to an hour. The extracted lignin, present in the alkaline solution, is precipitated by lowering the pH of the solution to a value of 3–5 with the use of, for example, an inorganic or organic acid. The precipitated solid lignin is then recovered and dried.

15 Claims, No Drawings

METHOD OF RECOVERING LIGNIN FROM PULP AND PAPER SLUDGE

FIELD OF THE INVENTION

The present invention relates to recovery of lignin, and in particular to its extraction from waste materials such as pulp and paper sludge.

BACKGROUND OF THE INVENTION

Pulp and paper sludge, a byproduct of primary pulping operations, recycle streams or waste paper pulping and the like, represents an environmental and disposal problem for manufacturers of paper. Generally, pulp and paper sludge is unsuitable for paper making, although it generally includes the same components—lignin, cellulose, hemicellulose, calcium carbonate, clay, and other inorganic components—as those present in the paper pulp itself.

A great variety of chemical components may be applied to paper sheet surfaces for specialized applications, as may be required, for example, by the advanced technologies of printing. Many paper surfaces are coated with suitable pigment-rich formulations to provide improved gloss, slickness, color, printing detail, and brilliance. In this context, the term "coating" usually refers to pigment coating. The mineral pigment used in coating is similar to a filler, but is usually finer. It is mixed with adhesives and other components to hold in onto the paper surface. It is not unusual for a coating mixture to contain more than ten ingredients, and some blends may contain more than fifteen different constituents. Clay is the most common pigment; others include calcium carbonate, synthetic silicates, titanium dioxide, plastic pigments (polystyrene), etc.

Lignin, the organic substance which, with cellulose, constitutes the essential part of woody plant tissue, is typically obtained as a byproduct of pulping processes. Lignin is used in a variety of applications ranging from production of vanillin to use as a dispersant (e.g., in concrete admixtures), as a binder (e.g., in animal feed pellets and coal briquettes), and as an emulsifier (e.g., in oil drilling mud additives). Numerous patents describe chemically modified lignin derivatives for use as natural adhesives, flocculants, sizing agents, and corrosion inhibitors (see, e.g., U.S. Pat. Nos. 4,775,744; 4,781,840; 4,787,960; and 4,789,523). Various forms of lignin have also been suggested as coagulating and flocculating agents to treat wastewater (see, e.g., U.S. Pat. No. 5,543,058).

Lignin can be found in the liquor generated during commercial papermaking, which typically involves reduction of wood to a fibrous mass through a series of cooking and bleaching operations using strong chemicals (a process known as pulping). The two principal chemical pulping methods are the alkaline kraft process and the acidic sulfite process, each producing a different type of extractable lignin. In the more common kraft process, wood chips are cooked in a solution of sodium hydroxide (NaOH) and sodium sulfide ($Na_2S$). The alkaline attack causes fragmentation of lignin molecules, whose sodium salts are soluble at high pH. Cooking is typically carried out at a temperature of 170°–180° C., a pressure of 8 atm. and a total processing time of ~150 min under alkaline conditions (total NaOH and $Na_2S$ of 16.5%) at a kraft "liquor" pH of 13 or higher. The spent cooking solution, which is referred to as "black liquor", is separated from the cellulosic fibers and typically sent to a recovery device, where the organic components of the liquor, including lignin, are combusted. A typical kraft black liquor contains 41% alkali lignin, 36% organic acids and lactones, 16% sodium, and 3% sulfur.

Separation of lignin from the black liquor is generally not undertaken by the pulping industry due to the limited quantity of recoverable lignin. Recovery techniques have, however, been developed, and typically involve acidification of the solution (see, e.g., U.S. Pat. Nos. 4,111,928; 4,265,809; and 5,034,094).

The sulfite pulping process involves cooking the wood chips in a solution of sulfurous acid ($H_2SO_3$) and bisulfite ($HSO_3$) salts of calcium, magnesium, sodium or ammonium at a cooking temperature of 120°–135° C. with an excess of the acid, resulting in a liquor pH of 1–2. The "bisulfite" process runs at 140°–160° C. at less acidic conditions, resulting in a liquor pH of 3–5. The sulfite process typically results in sulfonation of lignin, whereby sulfite groups become chemically attached to the lignin molecules. The sulfites combine with the lignin to produce relatively insoluble lignosulfonic acid, which, in the presence of the base, forms more soluble lignosulfonic salts (or lignosulfonates). Under conditions of high acid concentration and/or high temperature, lignin undergoes an undesirable polycondensation, forming a dark-colored and insoluble compound called "burned cook" in the pulp industry. Once again, the spent liquor of the sulfite pulping process is typically burned without recovery of lignin.

When spent pulping liquors are occasionally used for lignin recovery, the species obtained is generally lignosulfonates, which are used primarily for oil-drilling muds and production of vanillin. Owing to the different chemical conditions, lignosulfonates from acidic sulfite liquors are precipitated differently from the alkali lignins present in kraft black liquors. Lignosulfonates have relatively low molecular weights and high sulfur contents; while the molecular weights of alkali lignins vary, their sulfur contents are also relatively high. Sulfur generally limits the commercial usefulness of lignin, posing toxicity concerns, reduced biodegradability, and reduced ability to undergo certain useful chemical transformations (since sulfur selectively blocks various chemical functional groups and forms extremely tight complexes with some metals).

Lignin is also extracted directly from plant materials, although this is generally not considered commercially feasible. For example, Austrian Patent No. 263,661 discloses a method of hydrothermal pretreatment (so-called hydrothermolysis, or "aquasolv") of wheat straw, in which hot compressed water (180°–220° C. at 1.1–2.4 MPa) led through a biomass-filled reactor in a direct percolation mode extracts 30 to 60% of the plant biomass, i.e., practically all the hemicelluloses and a considerable part of the lignin. The process obtains between 44.4 and 58.0% of lignin initially present in the material. Various subsequent improvements (see, e.g., Austrian Patent No. 398,990) have increased this yield.

DESCRIPTION OF THE INVENTION

Brief Summary of the Invention

Significant impediments to more widespread commercial utilization of lignin are its limited practical availability for high-value applications and the expense of its recovery. In particular, because it is generally more cost-effective for paper mills to burn spent process liquor as a source of energy rather than extract lignin, the most abundant potential source of lignin is rarely exploited. Since commercially available lignin preparations, extracted from industrial black liquors, typically contain a significant amount of sulfur, this also limits the commercial usefulness of the recovered lignin.

The present invention utilizes an alternative source of lignin—pulp and paper sludge—that in fact represents perhaps the most significant disposal burden to paper mills rather than an energy source. Paper mill sludge is generated during the processing of virgin or recycled fiber for the production of paper or cardboard. Pulping or repulping of these materials and processing of the pulp in papermaking machines in the presence of large volumes of water results in carrying away significant amounts of the fiber, fillers, ink, and all other components present in the pulp. In the process of water recycling, the sludge is collected as settleable or floatable solids, pressed to a mass of 40–50% solids, and typically disposed of by landfilling or incineration.

In the stone groundwood (SGW) process, pulp is produced by pressing blocks of wood against an abrasive rotating stone surface. Thermomechanical pulping (TMP) involves steaming wood chips under pressure for a short period of time prior to and during refining. Chemithermomechanical pulping (CTMP) utilizes a modest chemical impregnation (usually with sodium sulfite solution) during the steaming stage. Paper sheets formed from these types of pulp have a relatively high lignin content. When paper is subjected to repulping and the following screening, cleaning, thickening, and other processing steps, typically in the presence of large volumes of water, so-called groundwood paper sludge is collected as settleable or floatable solids.

During de-inking, for example, at least 10% and as much as 25–30% of the fiber mass is lost, which mixed with process water constitutes de-inked pulp mill sludge. It generally differs in composition from de-inked paper mill sludge that is generated during papermaking and carried away with process water. De-inked paper mill sludge is typically generated either from de-inked pulp, or the latter mixed with virgin pulp, plus ingredients added during the papermaking process. Generally, pulp and paper sludge is unsuitable for papermaking, although it generally includes the same components (lignin, cellulose, hemicellulose, calcium carbonate ($CaCO_3$), clay, and other inorganic fillers) as those present in the paper pulp itself.

The present invention is not only adapted to make use of this waste material as a source of lignin, but also exploits a key component ($CaCO_3$) to assist in lignin extraction and affect the final composition of the isolated lignin. The invention, accordingly, provides a thermochemical process for the extraction and recovery of lignin from pulp and paper sludge. A major fraction of the lignin recovered pursuant to the invention has an average molecular weight close to one thousand dalton. The remainder has an apparent molecular weight of up to several hundred thousand to a million and higher, and may represent both individual highly polymeric lignin molecules and non-covalent associations of low-molecular weight lignin fragments. The extracted lignin contains less than 1% sulfur and has a higher purity compared with that isolated from kraft black liquor.

The invented extraction of lignin from sludge involves mixing paper sludge in a solution of NaOH—0.4% to 4% by weight, preferably 0.5% to 2%, and most preferably 1% NaOH by weight—the optimal concentration depending on process conditions (e.g., the presence of neutralizing species). The solution is heated in an autoclave at a temperature of 150°–250° C. (preferably 180°–220° C., and most preferably 200° C.) for a short time, e.g., from about half an hour to an hour.

Recycled paper sludge typically contains a rather high amount of $CaCO_3$ (up to 20%–50% or more). In the presence of NaOH, $CaCO_3$ is converted to calcium hydroxide, $Ca(OH)_2$, in the reaction delignification mixture. $Ca(OH)_2$, a strong alkaline agent, facilitates lignin extraction and increases its purity, upgrading the quality of the lignin produced.

After heating, the mixture is allowed to cool down, and is then acidified to pH 3 to 5 to precipitate the lignin. The precipitate is recovered by sedimentation, filtration, centrifugation, extraction with a water-immiscible organic solvent, or other suitable separation method and can be further dried to a powder form.

Detailed Description of the Preferred Embodiments
EXPERIMENTAL PROCEDURES

1. Determination of Acid-Insoluble and Acid-Soluble Lignin: the Sulfuric Acid-Based Procedure (SABP)

TAPPI procedure T 222 om-88 (Official Test Method 1983, Revised 1988) was used for acid-insoluble lignin determination in sludge and pulp. This procedure, however, can give a grossly exaggerated apparent lignin content when applied to sludge with a high ash content, and particularly in connection with a high calcium carbonate content. When the TAPPI procedure is followed, sulfuric acid added to a sludge sample converts calcium carbonate into calcium sulfate dihydrate (gypsum), and the weight of the residual material, dried at 105° C., is recorded. This material contains lignin, gypsum, other ash (minerals), and bound water. Ignition of the material at 525° C. removes not only lignin, but also bound water (the latter is lost from gypsum in two steps, at 128° C. and 163° C.). Hence, the TAPPI procedure must be corrected for the weight loss of bound water. Failure to make this correction leads to an error in lignin content determination; the lower lignin content and the higher calcium carbonate content, the higher will be the error.

Example 1: For a paper sludge containing 5% lignin (4.5% of acid-insoluble, and 0.5% of acid-soluble lignin), 45% cellulose (and other carbohydrates), and 50% ash (40% calcium carbonate and 10% clay and other inorganic materials), the treatment of 1000 mg of the material with sulfuric acid results in 834 mg of dry (at 105° C.) matter: 45 mg of lignin, 689 mg of gypsum, and 100 mg of clay and other inorganic materials. Combustion of that amount at 525° C. will yield 645 mg of ash (545 mg of anhydrous calcium sulfate and 100 mg of clay and other inorganic materials). The TAPPI procedure teaches that the acid-insoluble lignin content in the sludge is 834 mg less 645 mg, i.e., 189 mg, or a lignin content of 18.9% (4.2-fold higher than the actual amount, 4.5%).

Example 2 (for actual data see EXAMPLE 19 below): For a paper sludge containing 1.5% lignin, 38.1% ash (calcium carbonate only) with the balance being carbohydrates, the treatment of 1000 mg of the material with sulfuric acid results in 671 mg of dry (at 105° C.) matter: 15 mg of lignin and 656 mg of gypsum. Combustion of that amount at 525° C. yields 519 mg of ash (anhydrous calcium sulfate). The TAPPI procedure teaches that the acid-insoluble lignin content in the sludge is 671 mg less 519 mg, that is 152 mg, or a lignin content of 15.2% (an order of magnitude higher than the actual amount). This discrepancy was confirmed in the actual experiment, in which the sulfuric acid-based procedure gave an apparent lignin content 15.6%, while the kappa number-based procedure gave a lignin content 1.5%.

The concentration of the acid-soluble lignin (in g/L) was calculated by measuring the optical density of the collected filtrate at 205 nm (with 3% sulfuric acid as a reference blank), using an extinction coefficient value of 110 L/g-cm The amount of the acid-soluble lignin extracted from 1000 mg of the initial material was then calculated taking into account the total volume of the collected filtrate. The content of the acid-soluble lignin (in %) was determined in relation to 1000 mg of the initial material.

2. Determination of Lignin: the Procedure Based on Consumption of Potassium Permanganate Solution (Kappa Number Determination)

TAPPI procedure T 236 cm-85 (Classical Method 1985, Correction 1993) was used for lignin determination in sludge and pulp. This procedure, however, measures lignin reactivity (in terms of its oxidation with permanganate) rather than the actual content of lignin. It can result in an underestimated lignin content, particularly when samples exhibit a high "physical" content of lignin having a relatively low reactivity.

A sludge sample, 80 to 1000 mg, dispersed in a disintegration apparatus and placed in 795 mL of Milli-Q water at 25° C. (temperature-controlled water bath), was mixed with a fresh mixture of 100 mL of 0.02M (0.1N) solution of potassium permanganate and 100 mL of 2M (4N, 196 g/L) sulfuric acid, plus 5 mL of rinse water, for a total volume of 1000 mL. In exactly 10 min, 20 mL of 1.0M (1.0N) solution of potassium iodide was added and quickly mixed, and the free iodine in the mixture was titrated with 0.2M (0.2N) sodium thiosulfate solution until the purple color disappeared (a few drops of 0.2% starch indicator was added in the course of the titration). The kappa number was calculated as 2×|(mL of thiosulfate added to blank)−(mL of thiosulfate added to test)|, divided by the weight of the dry sample. Blank was the same set-up but without sludge added. Typically, the blank consumed 48 to 52 mL of the thiosulfate solution. Most determinations of kappa numbers were made with 25±7 mL of the thiosulfate solution consumed. When it was outside this range, a lower or a higher sample weight was taken accordingly. The tabulated TAPPI factor was used to correct kappa numbers for improved precision. The percentage of Klason lignin in a sample was calculated as the kappa number multiplied by 0.13.

3. Determination of Calcium: Titration with EDTA

TAPPI procedure T 247 cm-83 (Classical Method 1983) was used for calcium determination in sludge and pulp. The procedure is based on EDTA titration of $HNO_3$-soluble calcium in ashed sludge and pulp.

4. Determination of apparent molecular weight of extracted lignin a) Ultrafiltration Fractionation of lignin extracts (in 1% NaOH) was performed in a 50-mL ultrafiltration chamber (Amicon, Beverly, Mass.) equipped with a DIAFLO ultrafiltration membrane, 43 mm in diameter, having a defined molecular cut-off value (Amicon, Beverly, Mass.). Membranes with cut-off values of 1,000(YM1), 10,000(YM10), 30,000 (PM30), 100,000(YM100), and 300,000(XM300) were used. Filtrate and concentrate were collected, and optical densities at 510 nm were determined and compared with that of the initial lignin extract. The optical density reading was assumed to be proportional to the lignin concentration in the solution. Thus, the optical density of the filtrate, passing through membranes of varying cut-off sizes, facilitated calculation of the fraction of the lignin having an apparent molecular weight equal to or less than that specified by the membrane.

This procedure does not distinguish between individual molecules of lignin and noncovalent associations of lignin molecules. Hence, apparent molecular weights obtained by this procedure (as well as by practically any molecular weight determination procedure) often refer to large aggregates of water/solvent-soluble lignin fragments, up to hundreds of thousands or millions of dalton.

b) Size exclusion chromatography—Sephadex G25 and Sephadex G200

Gel filtration chromatography separates sample molecules (or their aggregates) based on their ability to enter pores of a stationary phase (gel). Within a certain range of size and shape, characteristic for each gel-filtration medium, molecules and/or their associations enter pores to various extents (depending on their shape and size), and therefore exit the column at different elution volumes. Above a certain size (the exclusion limit), all molecules move equally fast and exit the column at the same elution volume. Obviously, this method cannot distinguish whether entities moving through the column are individual molecules or associations, and as a result, the chromatography often provides only apparent molecular weights. However, since a relatively small volume of the sample is loaded onto the gel chromatography column, a significant dilution of the sample during elution can sometimes result in a complete dissociation of the molecules and, therefore, in more accurate molecular weight values. This can be verified by loading of different volumes (for different chromatography runs) of the same sample on the column.

Sephadex G25 and Sephadex G200 (both from Sigma Chemical Company, St. Louis, Mo.) were swollen in 1% NaOH (since the lignin samples tested were extracted from sludge with 1% NaOH or were dissolved in 1% NaOH) for at least a day. A 13.7-mL column and a 30-mL column (total volumes) were packed with Sephadex G200 and Sephadex G25, respectively, and equilibrated with 1% NaOH. Blue Dextran (Sigma Chemical Company; approx. molecular weight 2,000,000) was used as a void volume marker (as 5 mg/mL solution in 1% NaOH, 0.2 mL loaded), and polystyrene sulfonate-Na salt, molecular weight 4,800 dalton (American Polymer Standards Corporation, Mentor, Ohio), and p-nitrophenol, molecular weight 139 (Fisher Scientific) were used as molecular weight standards. 0.2-mL, 0.1-mL, and 0.05-mL lignin samples or molecular weight markers in 1% NaOH were loaded onto the columns. The flow rate was 0.1–0.2 mL/min (Sephadex G200) and 1 mL/min (Sephadex G25). The optical density (OD) at 280 nm was recorded as an elution readout, and plotted against the elution volume. "High-molecular" and "low-molecular" lignin fractions (that is, earlier and later elution fractions) have practically identical spectra in the 240–600 nm wavelength region. Hence, all lignin fragments have practically the same extinction coefficient, and the OD of their solutions are equally linear with respect to concentration.

EXAMPLE 1

Lignin was extracted from mixed office waste/sludge (dried, not screened, dust-free, ash content 60%, $CaCO_3$ content 13.5%, moisture content 3.9%). The sludge contained 3.5% lignin (based on kappa number 27.2), or 16.2% of an "acid-insoluble lignin" (based on the sulfuric acid-based procedure described above), and 0.44% of acid-soluble lignin. Lignin was extracted by mixing 90 g of the material with 900 mL of tap water (10% consistency), adding 9 g of solid NaOH (1% of total volume), placing the mixture into an autoclave (Zipperclave, Autoclave Engineers, Erie, Pa.), operated at 60 rpm for 10 min, heating to 200° C. (it takes 60 min for the inner volume of the autoclave to reach that temperature) and incubating the mixture at 200° C. for 20 min. The autoclave furnace was then turned off and the mixture was allowed to cool down to an ambient temperature. The dark lignin-containing liquid was decanted and filtered, and the solid residue was placed into a large Buchner funnel and dewatered as much as possible. The lignin-containing liquid was filtered under house vacuum. As both fractions were pooled, 780 mL of the lignin-containing liquid was collected. The pH of the liquid was 12.5. The optical density (at 510 nm) of the liquid, diluted 10-fold, was 0.384 (translating to 3.84 for the undiluted lignin solution).

The lignin content in the washed and dried solid residue was 2.6% (based on kappa number 20.4), and the "acid-insoluble lignin" content, determined by SABP, was 13.7%. Thus, between 0.9% (from kappa number) and 2.5% (SABP) of the dried initial sludge was extracted with 1% NaOH. The residue after lignin extraction contained 0.18% acid-soluble lignin.

Drying of a 10-mL aliquote of the lignin-containing liquid in a Moisture Analyzer at 105° C. has shown that the liquid contains 1.72% solids, including 1.0% NaOH. Assuming that the rest of the solids represents extracted material, its concentration in the liquid can be estimated as 0.72%.

To 50 mL of the lignin-contained liquid, 2 mL of glacial acetic acid was added (providing 3.85% v/v concentration of acetic acid). The pH of the liquid dropped from 12.5 to 4.21, and a dark-brown precipitate appeared. After settling that took three to four days, 17 mL of the precipitate was obtained. Chemical analysis of the precipitate has shown that it contained 88% of Klason lignin (SABP).

EXAMPLE 2

The procedure of Example 1 was repeated, but with the difference that 2% NaOH was used for lignin extraction. The obtained lignin solution had a pH 12.7, and exhibited an optical density (at 510 nm) of 3.62 (as translated from OD 0.362 for a 10-fold diluted solution). After 2 mL of glacial acetic acid was added to 50 mL of the liquid, the pH decreased to 4.48, and 15 mL of precipitated lignin was obtained after settling.

EXAMPLE 3

The procedure of Example 1 was repeated, but with the difference that 0.5% NaOH was used for lignin extraction (4.5 g of NaOH per 900 mL of tap water). The obtained lignin solution had a pH of 11.3, and exhibited an optical density of 2.30 at 510 nm. After 1 mL of glacial acetic acid was added to 50 mL of the liquid, the pH decreased to 4.14, and 12 mL of precipitated lignin was obtained after settling.

Drying of a 10-mL aliquote of the lignin-containing liquid in a Moisture Analyzer at 105° C. has shown that the liquid contains 1.17% solids, including 0.5% NaOH. Assuming that the rest of the solids represents the extracted material, its concentration in the liquid can be estimated as 0.67%.

EXAMPLE 4

The procedure of Example 1 was repeated, but with the difference that 0.1% NaOH was used for lignin extraction (0.9 g of NaOH per 900 mL of tap water). The obtained lignin solution had a pH of 6.5, and exhibited an optical density of 1.25 at 510 nm. After 2 mL of glacial acetic acid was added to 50 mL of the liquid, the pH decreased to 3.28, and 3 mL of precipitated lignin was obtained after settling.

It is apparent that a decrease in NaOH concentration from 1% to 0.5% and further on to 0.1% results in a lower yield of extracted lignin.

EXAMPLE 5

The procedure of Example 1 was repeated, but with the difference that no NaOH was used for lignin extraction; 90 g of the dried sludge was mixed with 900 mL of tap water and heated as described in Example 1. The obtained solution had a pH of 6.0, and exhibited an optical density of 0.78 at 510 nm. After 2 mL of glacial acetic acid was added to 50 mL of the liquid, the pH decreased to 3.27, and 2 mL of a precipitate was obtained after settling.

It is apparent that a decrease in NaOH concentration from 0.5% to 0.1% and further on to zero results in a lower yield of extracted lignin.

EXAMPLE 6

The procedure of Example 1 was repeated, but with the difference that the sludge was an unbleached kraft OCC (old corrugated containers) mixed with office paper waste, lignin content 4.6±0.1% (based on kappa number 35.7±0.3; when SABP was employed, the apparent lignin content was 17.2±0.2%; the reason for that discrepancy is discussed above), and ash content 49.6%. The sludge consistency in the reaction mixture was 11.9%, and the mixture was kept at 200° C. for 90 min. Based on a moisture content of 60.6%, 229 g of the material (equivalent to 90 g of dry sludge) was mixed with 761 mL of tap water, 9 g of NaOH was added (to obtain 1%), and the mixture was treated as described in Example 1, except for the incubation time at 200° C. (10 min as opposed to the 20 min of Example 1). The obtained lignin solution exhibited an optical density of 6.2 at 510 nm (based on OD 0.62 of a 10-fold diluted solution). After 2 mL of glacial acetic acid was added to 50 mL of the lignin solution, the pH decreased to 4.15, and 26 mL of precipitated lignin was obtained after settling. This lignin was transferred onto G6 glass fiber filter paper (Fisher Scientific, Springfield, N.J.), dried at 105° C. and weighed. It yielded 262 mg of dry material, corresponding to 5.2% based on weight of the initial dry sludge.

The solid material obtained following lignin extraction was washed and dried. It contained 3.7% lignin (based on kappa number 28.6). An apparent lignin content, determined by SABP, was 14.1±0.9%, i.e., 3.1±1.1% lower than that of the initial material. The amount of acid-soluble lignin was 0.69±0.11% in the initial OCC, and 0.49±0.04% after the lignin extraction.

EXAMPLE 7

The procedure of Example 6 was repeated, but with the difference that 25% (v/w) of ethanol was added to the reaction system (200 g of the sludge [59.9% moisture content], 392 g of water, 200 mL of ethanol, and 8 g of dry NaOH), and the mixture was kept at 200° C. for 15 min. The obtained lignin solution exhibited an optical density (at 510 nm) of 7.14 (as translated from OD 0.357 for a 20-fold diluted solution). After 2 mL of glacial acetic acid was added to 50 mL of the liquid, 22 mL of precipitated lignin was obtained after settling.

EXAMPLES 8 AND 9

The procedure of Example 6 was repeated, but with the difference that the unbleached kraft OCC sludge was first soaked in 1% NaOH for 24 hrs before lignin extraction, and the sludge consistency in the reaction mixture was 11.3% (versus 11.9% in Example 6). For a comparison, in a concurrent experiment the procedure described in Example 6 was repeated, but for material having 11.3% consistency In each of the experiments 229 g of wet OCC (equivalent to 90 g of the dry material, see Example 6) were taken fo extraction with 1% NaOH. One batch of the material wa immersed into 600 mL of 1% NaOH and kept for 24 hrs Then 200 mL of 1% NaOH were added and the mixture wa heated to 209° C. After reaching this temperature, the oute furnace (heating element) was turned off, and removed afte 15 min. Temperature at that moment was 172° C. an continued to decrease. The optical density of the coole extract at 510 nm was 7.8. The amount of lignin precipitate with 2 mL of glacial acetic acid added to 50 mL of the lignin solution was 27 mL (after 6 days of settling). This material was transferred onto G6 glass fiber filter (Fisher Scientific, Springfield, N.J.), dried at 105° C., and weighed. It yielded 311 mg of dry material, corresponding to 6.2% based on weight of the initial dry sludge (cf. 5.2% in Example 6).

Another 229-g batch of OCC sludge was mixed with 800 mL of 1% NaOH, heated to 204° C., and the furnace was turned off after 90 min. The optical density of the cooled extract at 510 nm was 6.2. The amount of lignin precipitated with 2 mL of glacial acetic acid added to 50 mL of the lignin solution was 25 mL (after 7 days of settling). After drying, 252 mg of dry material was recovered, corresponding to 5.0% based on weight of the initial dry sludge.

EXAMPLES 10 THROUGH 12

The procedure of Examples 8 and 9 was repeated, but with the difference that the unbleached kraft OCC sludge was first milled in a blender, then one 90 g batch (as dry weight) in 900 mL of 1% NaOH solution in tap water was treated in the Zipperclave as described in Example 6, another 90 g batch (as dry weight) was soaked in 900 mL of 1% NaOH for 24 hrs before lignin extraction as described in Example 6, and yet another 90 g batch (as dry weight) was first soaked in 900 mL of 4% NaOH for 24 hrs following which lignin was extracted as described in Example 6 (but with 4% NaOH). The optical density of the cooled extracts at 510 nm were 7.02±0.08, 7.15±0.15, and 7.04±0.14, respectively. The amount of lignin precipitated with 2 mL of glacial acetic acid added to 50 mL of the lignin solution was 27 mL, 29 mL, and 28 mL, respectively.

EXAMPLE 13

The procedure of Example 1 was repeated, but with the difference that the initial material was an unbleached kraft OCC sludge from a different mill. Moisture content in the dried sludge was 3.6%, ash content 3.8%, lignin content 10.0±0.4% (based on kappa number 76.8±3.0; when SABP was employed, the apparent lignin content was 22%) and the material consistency was 11.4%. 90 g of the material was mixed with 791 mL of tap water, 9 g of NaOH was added, and the mixture was treated as described in Example 1. The obtained lignin solution exhibited an optical density of 4.7 at 510 nm. After 2 mL of glacial acetic acid was added to 50 mL of the lignin solution, 24 mL of precipitated lignin was obtained after settling. This lignin was transferred onto G6 glass fiber filter (Fisher Scientific, Springfield, N.J.), dried at 105° C. and weighed. It yielded 235 mg of dry material, corresponding to 4.7% based on the weight of the initial dry sludge.

The solid material obtained following lignin extraction was washed and dried. Its lignin content was 6.0% (based on kappa number 46.4), and the apparent lignin content, determined by SABP, was 17.8%. In both cases it was 4.1±0.1% lower than that of the initial material (cf. 2.5% and 3.1% for the lignin extraction from mixed office waste and OCC sludge, Examples 1 and 6, respectively). The amount of acid-soluble lignin was 0.98% in the initial OCC, and 0.78% after the lignin extraction.

EXAMPLE 14

The procedure of Example 1 was repeated, but with the difference that the material was a bleached CTMP pulp (practically dry material), lignin content 13.9% (based on kappa number 107), apparent lignin content (SABP) 25.5%, ash content 4.1%. 30 g of the material was mixed with 300 mL of 1% NaOH solution in tap water, and the mixture was treated as described in Example 1. The obtained lignin solution exhibited an optical density of 4.2 at 510 nm. After 2 mL of glacial acetic acid was added to 50 mL of the lignin solution, 28 mL of precipitated lignin was obtained after settling. This lignin was transferred onto G6 glass fiber filter (Fisher Scientific, Springfield, N.J.), dried at 105° C. and weighed. It yielded 236 mg of dry material, corresponding to 4.7% based on weight of the initial dry material. The amount of acid-soluble lignin was 1.5% in the initial CTMP, and 0.98% after the lignin extraction.

The solid material obtained from the lignin extraction was washed and dried. Its lignin content was 11.2% (based on kappa number 86), and its apparent lignin content (SABP) was 22.9±0.2% (2.65±0.05% lower than that for the initial material).

EXAMPLE 15

The procedure of Example 1 was repeated, but with the difference that the material was sawdust, with lignin content 29.6% (SABP; lignin content based on kappa number 64.7 was 8.4%), moisture content 1.3%. 80 g of the material was mixed with 800 mL of 1% NaOH solution in tap water, and the mixture was treated as described in Example 1. The obtained lignin solution exhibited an optical density of 8.6 at 510 nm. After 2 mL of glacial acetic acid was added to 50 mL of the lignin solution, 18 mL of precipitated lignin was obtained after settling. This lignin was transferred onto G6 glass fiber filter (Fisher Scientific, Springfield, N.J.), dried at 105° C. and weighed. It yielded 158 mg of dry material, that corresponds to 3.2% based on weight of the initial dry material.

The solid material obtained from the lignin extraction was washed and dried. Its lignin content was 27.6%, indicating that 2.0% of the initial material was extracted as lignin. The amount of acid-soluble lignin was 1.10% in the initial saw dust, and 0.87% after the lignin extraction.

EXAMPLES 16 AND 17

The procedure of Example 1 was repeated, but with the difference that the material was Stone Ground Wood pulp, practically dry, with lignin content 16.6±0.3% (SABP), ash content 0.24%. 45 g of the material was mixed with 450 mL of 1% NaOH solution in tap water, and the mixture was treated as described in Example 1. The procedure was repeated twice. The pH of the lignin extract was 10.4, and after 2 mL of glacial acetic acid was added to 50 mL of the lignin solution, the pH decreased to 3.9. These two separate experiments yielded 142 and 149 mg of dry lignin, corresponding to yields of 2.8% and 3.0%, respectively, based on the weight of the initial dry material.

The solid material obtained from the lignin extraction was washed and dried. Its lignin content was 10.2%, indicating that 6.1% of the initial material was extracted as lignin. The amount of acid-soluble lignin was 0.37±0.07% in the initial pulp, and 0.23% after the lignin extraction.

EXAMPLE 18

The procedure of Example 1 was repeated, but with the difference that the material was a sludge from yet another mill, with 56% moisture content, lignin content 5.1% (based on kappa number 39.5), ash content 56.9%, $CaCO_3$ content 24.4%. 150 g of the wet material was mixed with 586 ml of 1% NaOH solution in tap water, and the mixture was treated and described in Example 1, except the temperature reached 169° C. The optical density of the lignin extract (at 510 nm) was 4.5. After 2 mL of glacial acetic acid was added to 50 mL of the lignin solution, 20 mL of precipitated lignin was obtained after settling.

EXAMPLE 19

The procedure of Example 1 was repeated, but with the difference that the material was another mixed office sludge, with ash content 38.1%, $CaCO_3$ content 33%, and lignin content 1.5±0.2% (based on kappa number 11.5±1.3; SABP gave 15.6% lignin content). 0.27% of the sludge was acid-soluble lignin. Based on a moisture content of 47.3%, 180 g of the material (equivalent to 95 g of dry sludge) was mixed with 810 mL of 1% NaOH solution in tap water, and the mixture (11.7% consistency) was treated as described in Example 1. The obtained lignin solution exhibited an optical density of 2.8 at 510 nm. After 2 mL of glacial acetic acid was added to 50 mL of the lignin solution, 9 mL of precipitated lignin was obtained after settling. This lignin was transferred onto G6 glass fiber filter (Fisher Scientific, Springfield, N.J.), dried at 105° C. and weighed. It yielded 76 mg of dry material, corresponding to 1.5% based on weight of the initial dry material.

The solid material obtained from the lignin extraction was washed and dried. Its lignin content was 0.9% (based on kappa number).

EXAMPLE 20

The procedure of Example 1 was repeated, but with the difference that the sludge was a waste dissolving pulp, with ash content 14%. Based on a moisture content of 44.2%, 161 g of the material (equivalent to 90 g of dry sludge) was mixed with 830 mL of tap water (10.8% consistency). 9 g of NaOH were added (to obtain 1%), and the mixture was treated as described in Example 1. The obtained lignin solution had a pH of 10.4. After 1 mL of glacial acetic acid was added to 50 mL of the liquid, the pH decreased to 3.97, and 11 mL of precipitated lignin was obtained after settling.

EXAMPLE 21

The procedure of Example 1 was repeated, but with the difference that the material was kraft bleached hardwood pulp, with an apparent SABP lignin content 1.8% (0.14% acid-soluble lignin), 0.7% ash content. Based on moisture content of 45 g (dry weight) of the material (equivalent to 90 g of dry sludge) was mixed with 450 mL of 1% NaOH, and the mixture was treated as described in Example 1. The obtained lignin solution exhibited an optical density of 1.6 at 510 nm. After 2 mL of glacial acetic acid was added to 50 mL of the lignin solution, pH decreased from 12.4 to 4.0, and 2 mL of precipitated lignin was obtained after settling.

EXAMPLE 22

The procedure of Example 1 was repeated, but with the difference that the newsprint material was processed. The obtained lignin solution exhibited an optical density of 0.96 at 510 nm. After 2 mL of glacial acetic acid was added to 50 mL of the lignin solution, the pH decreased to 4.48, and 16 mL of precipitated lignin was obtained after settling.

EXAMPLES 23 AND 24

These Examples show the effect of sludge consistency on lignin yield and the recovered volume of the lignin solution. The procedure of Example 1 was repeated, but with the difference that the sludge consistency was 5% and 18%. The data are shown in Table 1.

TABLE 1

DELIGNIFICATION OF MIXED OFFICE SLUDGE WITH SODIUM HYDROXIDE: EFFECT OF SLUDGE CONSISTENCY

| Consistency, % | Temp. °C. | NaOH, % | Volume, mL | O.D. 510 nm | Lignin precipitated, mL |
|---|---|---|---|---|---|
| 5 | 200 | 1 | 790 | 2.12 | 19 |
| 18 | 200 | 1 | 485 | 8.47 | 28 |

When 2 mL of glacial acetic acid was added to 50 mL of both lignin solutions, obtained with 5% and 18% consistency, respectively, the pH decreased to 4.40 and 4.24, and 19 and 28 mL of precipitated lignin were obtained after settling.

It is apparent that increase of the sludge consistency provides a higher yield of lignin at 200° C. with 1% NaOH.

EXAMPLES 25 AND 26

These Examples further demonstrate the effect of sludge consistency on lignin yield. The procedure of Example 6 was repeated, but with the difference that the sludge consistencies were 18% and 30%. The data are shown in Table 2.

TABLE 2

DELIGNIFICATION OF OCC WITH SODIUM HYDROXIDE: EFFECT OF SLUDGE CONSISTENCY

| Consistency, % | Temp. °C. | NaOH, % | Lignin precipitated, mL | Lignin precipitated, mg |
|---|---|---|---|---|
| 18 | 200 | 1 | 36 | 485 |
| 30 | 200 | 1 | 43 | 667 |

It is apparent that increase of the sludge consistency provides a higher yield of lignin at 200° C. with 1% NaOH.

EXAMPLES 27 THROUGH 30

These Examples further demonstrate the effect of sludge consistency on lignin yield and the recovered volume of the lignin solution. The procedure of Example 1 was repeated but with the difference that the sludge consistencies were 5% and 18%, the temperature was 100° C., and NaOH concentrations were 1% and 4%. The data are shown in Table 3.

TABLE 3

DELIGNIFICATION OF MIXED OFFICE SLUDGE WITH SODIUM HYDROXIDE: EFFECT OF SLUDGE CONSISTENCY

| Consistency, % | Temp. °C. | NaOH, % | Volume, mL | O.D. 510 nm | Lignin precipitated, mL |
|---|---|---|---|---|---|
| 5 | 100 | 1 | 840 | 0.85 | 10 |
| 18 | 100 | 1 | 520 | 2.91 | 19 |
| 5 | 100 | 4 | 820 | 0.91 | 8 |
| 18 | 100 | 4 | 580 | 2.85 | 16 |

It is apparent that increase of the sludge consistency provides a higher yield of lignin at 100° C. with both 1% and 4% NaOH.

EXAMPLES 31 AND 32

These Examples further demonstrate the effect of sludge consistency on lignin yield and the recovered volume of th lignin solution. The procedure of Example 1 was repeated, but with the difference that the sludge consistency was 5% and 18%, the temperature was 200° C., and NaOH concentrations were 1% and 4%. The data are shown in Table 4.

TABLE 4

DELIGNIFICATION OF MIXED OFFICE SLUDGE WITH SODIUM HYDROXIDE: EFFECT OF SLUDGE CONSISTENCY

| Consistency, % | Temp. °C. | NaOH, % | Volume, mL | O.D. 510 nm | Lignin precipitated, mL |
|---|---|---|---|---|---|
| 5 | 200 | 4 | 820 | 1.99 | 20 |
| 18 | 200 | 4 | 640 | 9.05 | 32 |

EXAMPLES 33 THROUGH 40

These Examples show the effect of temperature on lignin yield. The procedure of Example 1 was repeated, but with the difference that the sludge consistency was 5% and 18%, temperature was 100° and 200° C., and NaOH concentrations were 1% and 4%. The data are shown in Table 5.

TABLE 5

DELIGNIFICATION OF MIXED OFFICE SLUDGE WITH SODIUM HYDROXIDE: EFFECT OF TEMPERATURE

| Temp. °C. | Consistency, % | NaOH, % | Volume, mL | O.D. 510 nm | Lignin precipitated, mL |
|---|---|---|---|---|---|
| 100 | 5 | 1 | 840 | 0.85 | 10 |
| 200 | 5 | 1 | 790 | 2.12 | 19 |
| 100 | 5 | 4 | 820 | 0.91 | 8 |
| 200 | 5 | 4 | 820 | 1.99 | 20 |
| 100 | 18 | 1 | 520 | 2.91 | 19 |
| 200 | 18 | 1 | 485 | 8.47 | 28 |
| 100 | 18 | 4 | 580 | 2.85 | 16 |
| 200 | 18 | 4 | 640 | 9.05 | 32 |

It is apparent that an increase in temperature from 100° to 200° C. provides a higher yield of lignin at all observed combinations of sludge consistency and NaOH concentration. The increase range of 1.5 to 2.5-fold.

EXAMPLES 41 THROUGH 48

These Examples show the effect of NaOH concentration on lignin yield. The procedure of Example 1 was repeated, but with the difference that the NaOH concentration was 1% and 4% for all combinations of sludge consistencies of 5% and 18%, and temperatures of 100° and 200° C. The data are shown in Table 6.

TABLE 6

DELIGNIFICATION OF MIXED OFFICE SLUDGE: EFFECT OF SODIUM HYDROXIDE CONCENTRATION

| NaOH, % | Consistency % | Temp. °C. | Volume, mL | O.D. 510 nm | Lignin precipitated, mL |
|---|---|---|---|---|---|
| 1 | 5 | 100 | 840 | 0.85 | 10 |
| 4 | 5 | 100 | 820 | 0.91 | 8 |
| 1 | 5 | 200 | 790 | 2.12 | 19 |
| 4 | 5 | 200 | 820 | 1.99 | 20 |
| 1 | 18 | 100 | 520 | 2.91 | 19 |
| 4 | 18 | 100 | 580 | 2.85 | 16 |

TABLE 6-continued

DELIGNIFICATION OF MIXED OFFICE SLUDGE: EFFECT OF SODIUM HYDROXIDE CONCENTRATION

| NaOH, % | Consistency % | Temp. °C. | Volume, mL | O.D. 510 nm | Lignin precipitated, mL |
|---|---|---|---|---|---|
| 1 | 18 | 200 | 485 | 8.47 | 28 |
| 4 | 18 | 200 | 640 | 9.05 | 32 |

It is apparent that an increase NaOH concentration from 1% to 4% does not result in any appreciable change in lignin yield at any of the observed combinations of temperature and sludge consistency. Two pairs of data showed a slight increase in the lignin yield, and two pairs showed a slight decrease. The overall change was 0±15%.

EXAMPLES 49 THROUGH 51

These Examples continue to show the effect of NaOH concentration on the lignin yield. The procedure of Example 6 was repeated, but with the difference that NaOH concentrations were 1%, 2%, and 4% at a sludge consistency of 30%. The data are shown in Table 7.

TABLE 7

DELIGNIFICATION OF OCC SLUDGE (30% CONSISTENCY): EFFECT OF SODIUM HYDROXIDE CONCENTRATION

| NaOH, % | O.D. 510 nm | Lignin precipitated, mL | Lignin precipitated, mg |
|---|---|---|---|
| 1 | 24.5 | 43 | 667 |
| 2 | 22.5 | 43 | 798 |
| 4 | 20.6 | 42 | 742 |

It is apparent that an increase in NaOH concentration from 1% to 4% does not result in any appreciable change in a yield of lignin.

EXAMPLE 52

The procedure of Example 1 was repeated, but with the difference that some intermediate sludge consistency (11.5%), temperature (150° C.), and NaOH concentration (2.5%) were chosen with respect to Examples 1 through 5, 23 through 24, and 27 through 48. This was done in order to verify the absence of major variations in lignin yield throughout an intermediate range of parameters. 670 mL of lignin solution was recovered. It exhibited an optical density of 5.16 at 510 nm. After 2 mL of glacial acetic acid was added to 50 mL of the lignin solution, 32 mL of precipitated lignin was obtained after settling.

EXAMPLE 53

The procedure of Example 1 was repeated, but with the difference that the initial material was a mixed office sludge from yet another mill, with moisture content 31.9%, lignin content 4.1% (based on kappa number 31.5), and ash content 48.8%; the material consistency was 10% in 1% NaOH solution. The obtained lignin solution exhibited an optical density of 4.6 at 510 nm. After 2 mL of glacial acetic acid was added to 50 mL of the lignin solution, 11 mL of precipitated lignin was obtained after settling. This lignin was transferred onto G6 glass fiber filter (Fisher Scientific, Springfield, N.J.), dried at 105° C. and weighed. It yielded 160 mg of dry material, corresponding to 3.2% based on the weight of the initial dry sludge.

EXAMPLE 54

The procedure of Example 53 was repeated, but with the difference that the initial material was dried long cellulose fiber separated from the mixed office sludge. This material had a lignin content of 3.1% (based on kappa number 23.3), an ash content of 6.5%, and a $CaCO_3$ content of 1.6%. 90 g of the material was mixed with 900 mL of 1% NaOH solution in tap water, and the mixture was treated as described in Example 1. The obtained lignin solution exhibited an optical density of 3.93 at 510 nm. After 2 mL of glacial acetic acid was added to 50 mL of the lignin solution, 16 mL of precipitated lignin was obtained after settling. This lignin was transferred onto G6 glass fiber filter (Fisher Scientific, Springfield, N.J.), dried at 105° C. and weighed. It yielded 155 mg of dry material, corresponding to 3.1% based on the weight of the initial dry material.

EXAMPLE 55

The procedure of Example 53 was repeated, but with the difference that the initial material was dried fines and minerals separated from the mixed office sludge. This material had a lignin content of 3.2% and an ash content of 52.9%. 90 g of the material was mixed with 900 mL of 1% NaOH solution in tap water, and the mixture was treated as described in Example 1. The obtained lignin solution exhibited an optical density of 4.72 at 510 nm. After 2 mL of glacial acetic acid was added to 50 mL of the lignin solution, 16 mL of precipitated lignin was obtained after settling. This lignin was transferred onto G6 glass fiber filter (Fisher Scientific, Springfield, N.J.), dried at 105° C. and weighed. It yielded 163 mg of dry material, corresponding to 3.3% based on the weight of the initial dry material.

EXAMPLE 56

The procedure of Example 1 was repeated, but with the difference that the sludge processed was successively treated with 20% acetic acid (to remove calcium carbonate) and cellulase enzymes (to remove cellulose); the consistency of the material was 8%. The combined residue was washed after the enzymatic conversion, and its acid-insoluble lignin content, determined using SABP, was 28.9%. 188 g of this material (moisture content 61%), corresponding to 73 g of dry weight, was mixed with 800 g of tap water, and 9 gof NaOH was added (to obtain 1%); the sample was processed as in Example 1. The obtained lignin solution exhibited an optical density of 4.45 at 510 nm (this OD value was linear for 1:3, 1:4, and 1:10 dilutions). After 2 mL of glacial acetic acid was added to 50 mL of the lignin solution, 29 mL of precipitated lignin was obtained after settling (cf. 17 mL obtained in Example 1).

EXAMPLE 57

The lignin extract obtained in a separate experiment, similar to Experiment 6, exhibited an optical density of 4.21 at 510 nm. It was subjected to ultrafiltration as described above, through a membrane of 30,000 dalton cut-off. The filtrate, containing lignin with an apparent molecular weight 30,000 and less, exhibited an optical density of 1.62. Thus, the lignin concentration in the filtrate was 2.60 lower than in the initial extract; this indicates that 38% of the extracted lignin has an apparent molecular weight 30,000 or less (while 62% is above an apparent molecular weight 30,000).

EXAMPLE 58

The procedure of Example 57 was repeated, using ultra-filtration membranes having cut-off values of 1,000, 10,000, 100,000, and 300,000 dalton. The optical densities of the respective filtrates, passing through the membranes, were 0.065, 1.02, 1.94, and 2.33. These data, together with those given in Example 57, gave the apparent molecular weight distribution of the lignin from unbleached kraft OCC sludge shown in Table 8.

TABLE 8

APPARENT MOLECULAR WEIGHT DISTRIBUTION OF LIGNIN RECOVERED FROM UNBLEACHED KRAFT OCC

| Apparent Molecular Weight | Fraction of Lignin re. the Total Amount, % |
|---|---|
| Below 1,000 | ≦1 |
| Above 10,000 | 76 |
| Above 30,000 | 62 |
| Above 100,000 | 54 |
| Above 300,000 | 47 |

EXAMPLE 59

The lignin extract obtained in Example 14 was subjected to ultrafiltration as described above using membranes having cut-off values of 1,000, 10,000, 30,000, and 300,000 dalton. The optical densities of the respective filtrates, passing through the membranes, were 0.052, 0.57, 0.975, and 1.33. These data, calculated as shown in Example 57, gave the apparent molecular weight distribution of the lignin from bleached CTMP pulp shown in Table 9.

TABLE 9

APPARENT MOLECULAR WEIGHT DISTRIBUTION OF LIGNIN RECOVERED FROM BLEACHED CTMP PULP

| Apparent Molecular Weight | Fraction of Lignin re. the Total Amount, % |
|---|---|
| Below 1,000 | ≦1 |
| Above 10,000 | 86 |
| Above 30,000 | 79 |
| Above 300,000 | 68 |

EXAMPLE 60

A lignin extract prepared as in Example 6 was examined by gel filtration chromatography using a Sephadex G200 column as described above. Blue Dextran (a "void volume" marker, approximate molecular weight 2,000,000) showed a peak starting at an elution volume of 3.5 mL with a maximum at 4.5 mL. Polystyrene sulfonate-Na salt (a marker, molecular weight 4,800) showed an elution peak at 11 mL. p-Nitrophenol (a marker, molecular weight 139) showed an elution peak at 14.5 mL. The lignin extract showed a very small elution peak at 4.5 mL, and a single major peak at 12.5 mL. A semi-log plot (log of molecular weight vs. relative elution volume) indicates an average molecular weight 1,000±50 for a principal lignin component.

EXAMPLES 61 THROUGH 64

The gel filtration procedure of Example 60 was repeated using four filtrates of lignin obtained in Examples 57 and 58, with apparent molecular weights of lignin below 300,000, 100,000, 30,000, and 10,000 dalton, respectively. All four lignin preparations showed a minor elution peak at 4.5 ml (high-molecular weight lignin fragments and/or their associations) of consistently diminishing height, and an identical major elution peak at 12.5 mL corresponding to lignin with molecular weight of 1,000±50.

17

These examples illustrate that lignin of molecular weight 1.000±50 is the principal component of both the whole lignin extract and its fractions obtained by passing through controlled-pore membranes of different cut-off, from 10.000 to 300.000 dalton. This further indicates that the lignin, even at rather low concentrations (i.e., 0.5% to 1%), exists predominantly as high-molecular associations. These dissociate in the course of gel filtration, as Examples 60 through 64 demonstrate.

EXAMPLE 65

The gel filtration procedure of Example 60 was repeated, using lignin extract prepared from OCC as in Example 13. It yielded a major elution peak at 12.5 mL, corresponding to lignin of molecular weight 1.000±50 (identical with that of lignin extract obtained as in Example 6 from another sludge source). The only difference was that in this example the amount of high-molecular lignin (individual molecules and/or their associations) was higher, about an order of magnitude compared with that in Example 60.

EXAMPLE 66

The gel filtration procedure of Example 60 was repeated, using lignin extracted from an industrial black liquor by acidification, in the manner described in Example 1. The lignin preparation was obtained from Lenox Resources Ltd. (Port Huron, Mich.). It showed an almost identical elution profile with that in Example 65, except that its small high-molecular weight peak, eluting with the void volume (at 4.5 mL), was about two times lower than that in Example 65. The major elution peak (at 12.5 mL) of the lignin corresponded to molecular weight 1.000±50.

EXAMPLES 67 AND 68

A lignin extract made as in Example 6, and its 10.000-dalton molecular weight cut-off fraction obtained by filtration through controlled-pore membranes as in Example 58 were examined by gel filtration chromatography using a Sephadex G25 column as described above. The major peak (82% of an integral optical density at 280 nm) of the whole lignin extract was eluted with the void volume (defined by using Blue Dextran as a marker), and the rest was eluted at a position corresponding to 950±50 dalton. The 10.000-dalton cut-off lignin fraction revealed the same molecular weight for one-third of the total lignin amount (based on an integral optical density at 280 nm), with the other two-thirds of the total amount eluted as a broad peak at a position corresponding to an average value of 3.300 dalton. This peak did not appear when the Sephadex G200 column was used.

Since elution on the Sephadex G25 column was 5 to 10 times faster compared with the Sephadex G200 column, the example apparently illustrates that dissociation of lignin associations takes some time. It appears that the longer elution time through the Sephadex G200 column allows the lignin associations to dissociate essentially completely to their individual molecules with an average molecular weight of 1.000±50 dalton.

EXAMPLES 69 THROUGH 71

These examples describe lignin isolation from the alkaline extracts (in 1% NaOH) obtained as in Examples 6 and 13, using the water-immiscible solvent mesityl oxide with subsequent acidification of the mixture. The procedure was adopted and modified based on U.S. Pat. No. 4.265.809. 500 mL of each of the lignin extracts in 1% NaOH (Examples 6 and 13) were mixed with 200 mL of mesityl oxide, stirred for 20 min, and 20 and 25 mL, respectively, of 80% acetic acid was added. The pH decreased to 4.33 and 4.55, respectively, and the color of the mixtures changed from dark-brown to light-brown and creamy. The mixtures were stirred for 15 min more, transferred into two separatory funnels and left overnight to settle. Two distinct layers formed, the top, light-brown and creamy; and the bottom, a darker brown. The top layer (lignin in mesityl oxide) was mashy and highly viscous, while the bottom layer was more water-like. The top layer was poured onto a flat surface and the lignins were air-dried.

The same procedure was used for the isolation of lignin obtained from an industrial black liquor and then redissolved in 1% NaOH. After 25 mL of 80% acetic acid was added, the pH of the mixture was 4.69. The mesityl oxide extract of the precipitated black liquor lignin was also air-dried as described for the other two lignin preparations.

EXAMPLES 72 THROUGH 78

These examples illustrate a test for reactive lignin content in several isolated dry lignin preparations: (Example 72) lignin isolated from an industrial black liquor by acidification and precipitation (the same lignin preparation as used in Example 66), (Example 73) lignin obtained as in Example 13 and isolated using mesityl oxide as in Example 70, (Example 74) lignin obtained from an industrial black liquor and isolated using mesityl oxide as in Example 7, (Example 75) lignin obtained as in Example 1 and isolated by acidification and precipitation, (Example 76) lignin obtained as in Example 6 and isolated using mesityl oxide as in Example 69, (Example 77) lignin isolated by a steam explosion process and isolated by extraction with 0.25% NaOH, and (Example 78) lignin obtained by a steam explosion process and isolated by extraction with alcohol. The last two lignin preparations were provided by Tigney Technology Inc., Edmonton, Alberta, Canada. These lignin preparations are listed in Table 10.

The reactive lignin content was estimated using the kappa number measurements. The lignin in Example 75 was tested for sulfur content, and found to contain less then 1% of sulfur (0.66%). This is noticeably less than the sulfur contents of a number of commercial lignin preparations.

TABLE 10

REACTIVE LIGNIN CONTENT IN SOME ISOLATED DRY LIGNIN PREPARATIONS

| Example | Source | Reactive Lignin Content (based on kappa number), % |
|---|---|---|
| 72 | Black liquor lignin (isolated by acidification) | 25 ± 2 (k = 192 ± 15) |
| 73 | Lignin from OCC (isolated with mesityl oxide) | 26 (k = 203) |
| 74 | Black liquor lignin (isolated using mesityl oxide) | 30 (k = 231) |
| 75 | Lignin from mixed office waste (isolated by acidification) | 49 (k = 376) |
| 76 | Lignin from mixed office waste (isolated with mesityl oxide) | 53 ± 2 (k = 408 ± 15) |
| 77 | Steam explosion lignin (isolated using NaOH extraction) | 72 ± 2 (k = 554 ± 15) |
| 78 | Steam explosion lignin (isolated using alcohol extraction) | 78 ± 1 (k = 600 ± 2) |

EXAMPLE 79

This example further illustrate the chemical reactivity of lignin preparations extracted as in Example 6. This test was adopted and modified based on the U.S. Pat. No. 4,265,809. 500 mL of the lignin solution (in 1% NaOH) was mixed with 200 mL of mesityl oxide and stirred for 20 min. Then 15 mL of 80% acetic acid was added slowly. The pH of the mixture was 4.79. The mixture was stirred for 15 min.

The separated lignin-solvent layer was placed into a 500-mL, 3-neck, round-bottom flask, equipped with a thermometer, dropping funnel, and a magnetic stirrer. 40 mL of 37% aqueous formaldehyde was added dropwise over a 10-min interval, while stirring. Then 40 mL of Milli-Q water was added and stirred for 5 min, followed by addition of 6 mL of triethylamine, and the mixture was stirred for 30 min. The dropping funnel was replaced with a water-cooled condenser, and the mixture was refluxed for 30 min (temperature reached 93° C.) and cooled to room temperature while stirred. The liquid obtained is said in the '809 patent to be a reactive lignin unsaturated carbonyl intermediate that may be epoxidized.

The water-cooled condenser was replaced again with the dropping funnel, the mixture was cooled to 5° to 10° C. with an ice bath, and 1.3 g of magnesium sulfate premixed with 13 mL of Milli-Q water was added dropwise over a 10-min interval while the mixture was stirred. Then 1.4 g of NaOH in 13 mL of Milli-Q water was added dropwise, followed by dropwise addition of 4 mL of 30% hydrogen peroxide over 30 min under constant stirring, while the mixture was maintained between 5° to 10° C. 50 mL of Milli-Q water was then added, and the mixture was stirred for one hour while the temperature was still maintained between 5° to 10° C. Then 13 g of sodium sulfate was added and the mixture stirred for 15 min. The mixture was poured into a separatory funnel and left overnight at room temperature.

A layer of epoxy-lignin was formed on the top, and a small amount of undissolved sodium sulfate settled on the bottom. The lignin-epoxy was separated, and mixed in three separate baths with (a) 30-40% (v/v) of triethylenetetramine, (b) 15% of tetramine, and (c) 10% tetrainine. The reaction was exothermic, and the mixture thinned out. After stirring with magnetic stirrer for about 30 min, the mixture became very viscous. The polymeric material produced was insoluble in 1% NaOH.

EXAMPLE 80 AND 81

This example further illustrates the chemical reactivity of lignin preparations extracted and precipitated as in Example 1. This test was adopted and modified based on U.S. Pat. No. 4,455,257.

3.0 g of dry lignin was slurried in 7.35 mL of Milli-Q water with a magnetic stirrer. 0.6 mL of 37% formaldehyde solution was added, and stirred for 30 min at room temperature. 1.5 mL of triethylenetetramine was then added to this mixture under continuing stirring. The reaction was exothermic, and the mixture gradually became viscous. According to the '257 patent, a cationic polymeric product was formed.

In the same manner, 10.2 g of dry black liquor lignin (as in Examples 66, and 72 through 78) was slurried in 25 mL of Milli-Q water with a magnetic stirrer. 2 mL of 37% formaldehyde solution was added, and the mixture stirred for 30 min at room temperature. 5 mL of triethylenetetramine was then added to this mixture under continuing stirring. The reaction was exothermic, and the mixture gradually became very viscous. According to the '257 patent, a cationic polymeric product was formed.

It will be apparent from the above that a new and unique process has been disclosed for the recovery of reactive lignin from pulp and paper sludge. This lignin is suitable for many uses, including preparation of foundry resins, hardened resinous or plastic products, flocculation agents, etc. This process therefore provides a new source for lignin, pulp and paper sludges, which have been primarily burned or landfilled, creating environmental pressure. It will be clear from the present disclosure that lignin resulting from waste paper sludge in general may be utilized for the disclosed purposes and it need not have been separated solely by the process disclosed herein.

Although this invention has been described in its preferred form and preferred practice with a certain degree of particularity, it should be understood that the present disclosure of the preferred form and preferred practice has been made only by way of example and that numerous changes may be resorted to without departing from the spirit and the scope of the invention as hereinafter claimed.

What is claimed is:

1. A method of extracting lignin from an aqueous mixture comprising plant fiber, the method comprising the steps of:

a. combining the mixture with an alkaline solution;

b. heating the alkaline-containing mixture to extract lignin;

c. adjusting the pH so as to precipitate the extracted lignin; and d. recovering the precipitated lignin.

2. The method of claim 1 wherein the mixture comprises paper sludge derived from at least one of (a) fine paper sludge, (b) coated paper sludge, (c) coated fine paper sludge, (d) groundwood paper sludge, (e) recycle mixed office paper sludge, (f) recycled newsprint, (g) de-inked pulp mill sludge, (h) de-inked paper mill sludge, (i) old corrugated containers.

3. The method of claim 1 wherein the alkaline solution comprises an amount of sodium hydroxide ranging from 0.4% to 4% by weight.

4. The method of claim 1 wherein the alkaline solution comprises an amount of sodium hydroxide ranging from 0.5% to 2% by weight.

5. The method of claim 1 wherein the mixture is combined with 1% sodium hydroxide by weight.

6. The method of claim 1 wherein the mixture is heated to a temperature ranging from 150° C. to 250° C.

7. The method of claim 1 wherein the mixture is heated to a temperature ranging from 180° C. to 220° C.

8. The method of claim 1 wherein the mixture is heated to a temperature of 200° C.

9. The method of claim 1 wherein the mixture comprises calcium carbonate.

10. The method of claim 1 wherein the plant fiber is contained in at least one of (a) unbleached kraft pulp, (b) bleached kraft pulp, (c) old corrugated cardboard (d) CTMP pulp, (e) recycled newsprint, and (f) groundwood pulp.

11. The method of claim 1 wherein the precipitation step comprises acidifying the mixture.

12. The method of claim 1 wherein the recovering step comprises separating the precipitated lignin from the mixture by at least one of (a) sedimentation, (b) filtration, (c) centrifugation, and (d) extraction with a water-immiscible organic solvent.

13. The method of claim 1 wherein the recovered lignin has an average molecular weight of approximately 1000 dalton or higher.

14. A composition comprising lignin extracted in accordance with claim 1.

15. The composition of claim 14 wherein the lignin has an average molecular weight of at least 1000 dalton.

* * * * *